United States Patent
Karl et al.

(10) Patent No.: US 9,920,784 B2
(45) Date of Patent: Mar. 20, 2018

(54) ASSEMBLY WITH AT LEAST TWO COMPONENTS THAT ARE FIXED TOGETHER

(75) Inventors: Joachim Karl, Sand (DE); Klaus Hampel, Coburg (DE); Ralph Gerstlauer, Schonungen (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 791 days.

(21) Appl. No.: 14/232,181

(22) PCT Filed: Jul. 7, 2012

(86) PCT No.: PCT/EP2012/002871
§ 371 (c)(1),
(2), (4) Date: Jan. 10, 2014

(87) PCT Pub. No.: WO2013/007368
PCT Pub. Date: Jan. 17, 2013

(65) Prior Publication Data
US 2014/0152036 A1    Jun. 5, 2014

(30) Foreign Application Priority Data
Jul. 13, 2011   (DE) .................. 20 2011 103 327 U

(51) Int. Cl.
*F16B 5/04*         (2006.01)
*F16B 5/06*         (2006.01)
(Continued)

(52) U.S. Cl.
CPC .......... *F16B 39/284* (2013.01); *B60J 5/0416* (2013.01); *B60J 5/0468* (2013.01); *F16B 5/065* (2013.01);
(Continued)

(58) Field of Classification Search
CPC .......... F16B 5/04; F16B 5/045; F16B 5/0462; F16B 5/065; F16B 39/284; B60J 5/0468;
(Continued)

(56) References Cited

U.S. PATENT DOCUMENTS 1,986,981 A * 1/1935 Ross ..................... E04B 1/2403
                                                            403/404
3,362,737 A * 1/1968 Cobb ........................ F16B 5/02
                                                            403/373
(Continued)

FOREIGN PATENT DOCUMENTS

CA    2 506 055 A1    11/2005
CN    1693059 A       11/2005
(Continued)

OTHER PUBLICATIONS

Machine Translation of DE19607687A1, Nov. 14, 2016, http://translationportal.epo.org/emtp/translate?ACTION=description-retrieval&COUNTRY=DE&ENGINE=google&FORMAT=docdb&KIND=A1&LOCALE=en_EP&NUMBER=19607687&OPS=ops.epo.org%2F3.2&SRCLANG=de&TRGLANG=en&apikey=TSMqTfrVAvNtryGI8QIfbozj8DnAGIqJ&PDF=vGcgfViHwGj2iP3zpTI8MzuRJC7qRUEY9PLnC2KrmA6gR15322xi6i9xUWRQ1.*
(Continued)

*Primary Examiner* — Ryan D Kwiecinski
(74) *Attorney, Agent, or Firm* — Lewis Roca Rothgerber Christie LLP

(57) ABSTRACT

The invention relates to an assembly for a motor vehicle comprising at least a first component and a second component, for example a carrier and a guide rail of a window lifter which are fixed together by means of at least one fastening element, in this case by a plurality of rivets. A fastening element engages into openings of which one opening respectively is formed in a receiving portion of the first component and one on a protrusion of the second component, wherein (Continued)

a protrusion respectively protrudes in an associated receiving portion and a flexible or elastic edge section of a receiving portion can be shifted in the direction of the associated protrusion. The at least one edge section that can be shifted in a flexible manner is designed and provided for compensating manufacturing tolerances, such that the two components automatically align to one another in the area of the flexible edge section during the fastening process and can form a solid connection as intended, wherein the protruding section is locked in the receiving portion by the edge section which is shifted and pushed against the protruding section.

16 Claims, 6 Drawing Sheets

(51) Int. Cl.
    *F16B 39/28*     (2006.01)
    *B60J 5/04*     (2006.01)
    *F16B 39/284*     (2006.01)

(52) U.S. Cl.
    CPC .......... *F16B 5/0642* (2013.01); *Y10T 403/62* (2015.01); *Y10T 403/75* (2015.01)

(58) Field of Classification Search
    CPC .. B60J 5/0416; B60R 13/0206; Y10T 403/62; Y10T 403/75
    See application file for complete search history.

(56) References Cited

U.S. PATENT DOCUMENTS

| | | | | |
|---|---|---|---|---|
| 4,746,239 | A | * | 5/1988 | Marquardt .............. F16B 39/28 312/257.1 |
| 5,385,433 | A | | 1/1995 | Calandra, Jr. et al. |
| 5,628,581 | A | * | 5/1997 | Hintz ...................... E04L 39/02 403/380 |
| 5,820,323 | A | | 10/1998 | Barandun |
| 6,081,984 | A | * | 7/2000 | Sherry ..................... B21J 15/02 29/432.2 |
| 2004/0190980 | A1 | * | 9/2004 | Akita ........................ F16B 5/02 403/256 |
| 2012/0124816 | A1 | * | 5/2012 | Berger .................. B29C 70/845 29/525.05 |
| 2014/0186141 | A1 | * | 7/2014 | Schneider ................. F16B 5/04 411/501 |
| 2015/0016871 | A1 | * | 1/2015 | Sugimoto ................. F16B 5/08 403/271 |
| 2015/0093178 | A1 | * | 4/2015 | Morris .................... B62D 27/02 403/13 |
| 2015/0139755 | A1 | * | 5/2015 | Lu .......................... F16B 19/004 411/510 |
| 2015/0165609 | A1 | * | 6/2015 | Morris .................. F16B 5/0628 269/52 |

FOREIGN PATENT DOCUMENTS

| | | |
|---|---|---|
| DE | 41 40 574 A1 | 6/1993 |
| DE | 196 07 687 A1 | 9/1997 |
| DE | 198 47 268 A1 | 4/2000 |
| DE | 199 39 655 C1 | 12/2000 |
| DE | 101 26 047 A1 | 8/2002 |
| EP | 0 538 549 A1 | 4/1993 |
| EP | 1 380 757 A1 | 1/2004 |
| EP | 1 517 808 B1 | 3/2005 |
| JP | 49-95460 | 8/1974 |
| JP | 49-96804 | 8/1974 |
| JP | 57-55673 | 4/1982 |
| JP | 60-24615 U | 2/1985 |
| JP | 60-180656 U | 11/1985 |
| JP | 1-113041 U | 7/1989 |
| JP | 1-157082 U | 10/1989 |
| RU | 2 140 587 C1 | 10/1999 |
| WO | WO 2004/106685 A1 | 12/2004 |

OTHER PUBLICATIONS

Russian Office action for Application No. 2014101960/11, dated Jan. 29, 2015 with English translation, 10 pages.
Notification of Reasons for Rejection for Application No. JP 2014-519448, dated Feb. 10, 2015, and English Translation (6 pages).
International Search Report, corresponding to PCT/EP2012/002871, dated Sep. 21, 20012, 6 pages.
Chinese Search Report for Application No. 2012800347868, dated Dec. 2, 2014, 2 sheets.

* cited by examiner

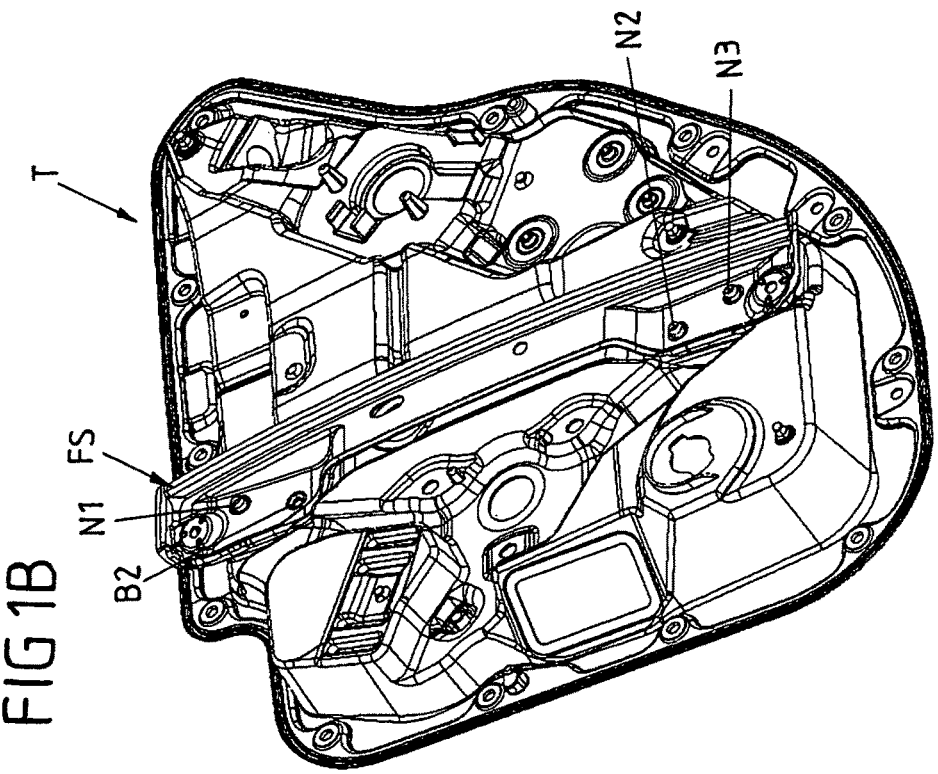
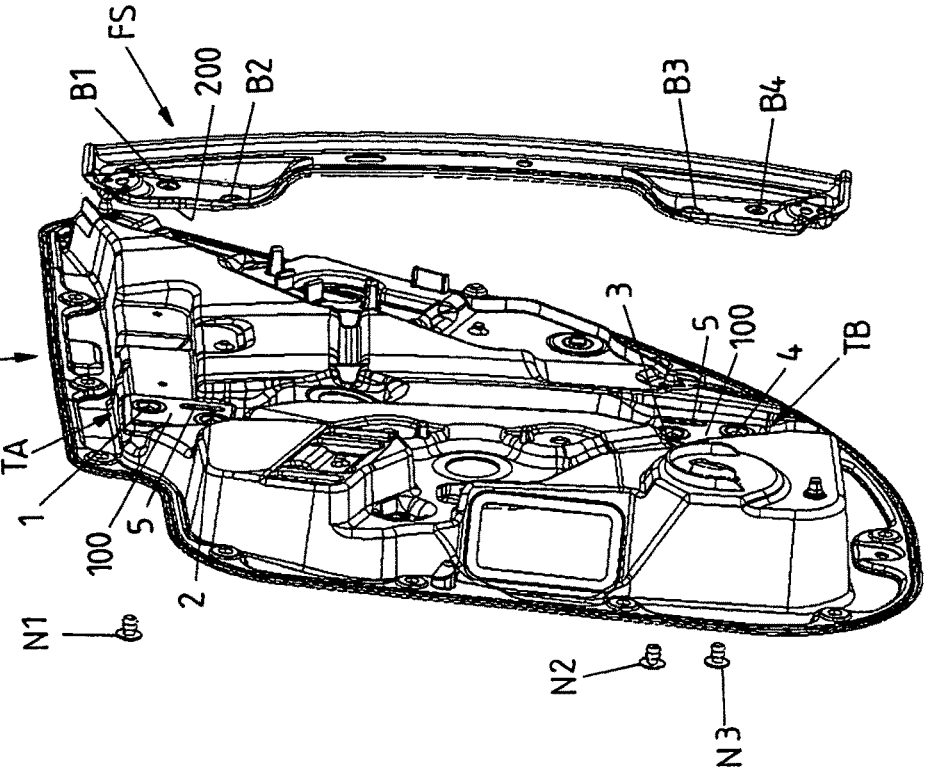

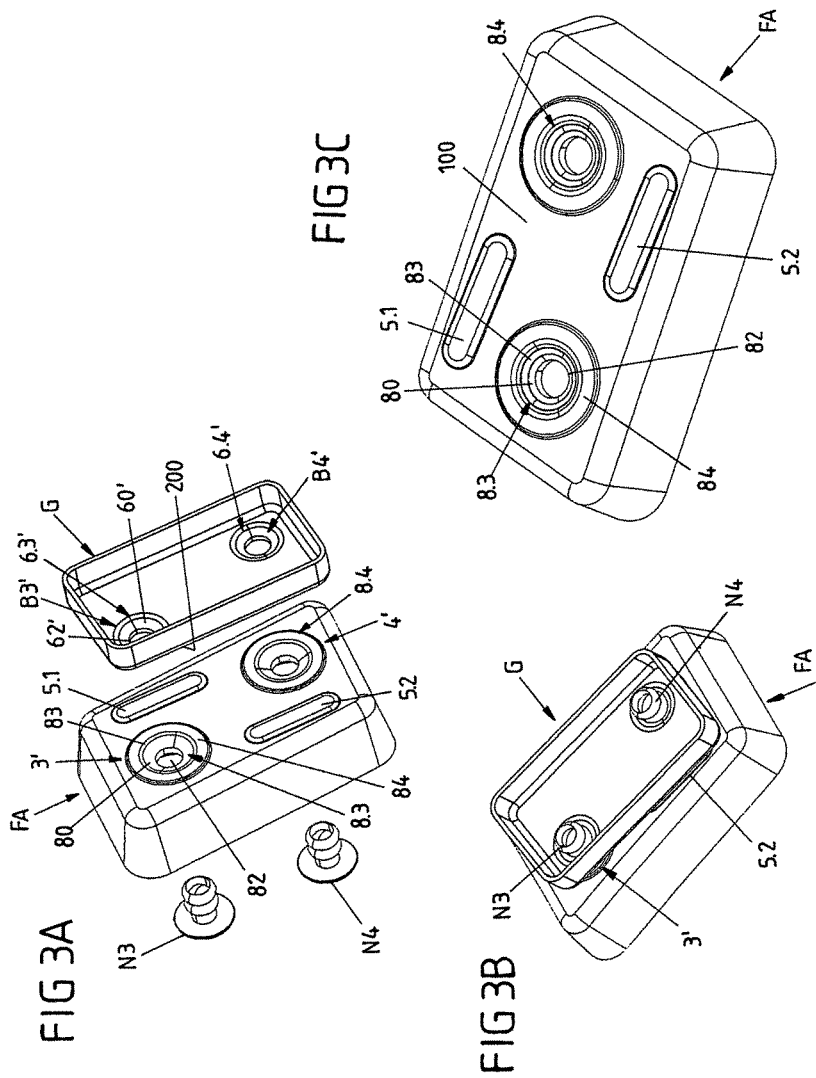

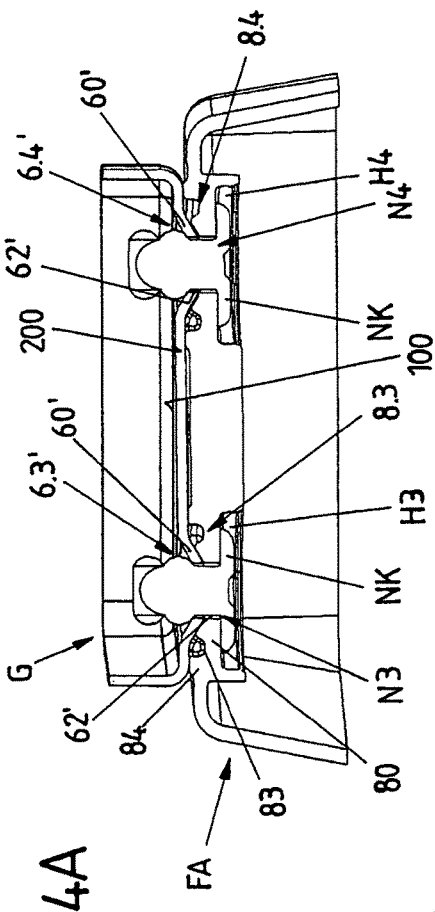
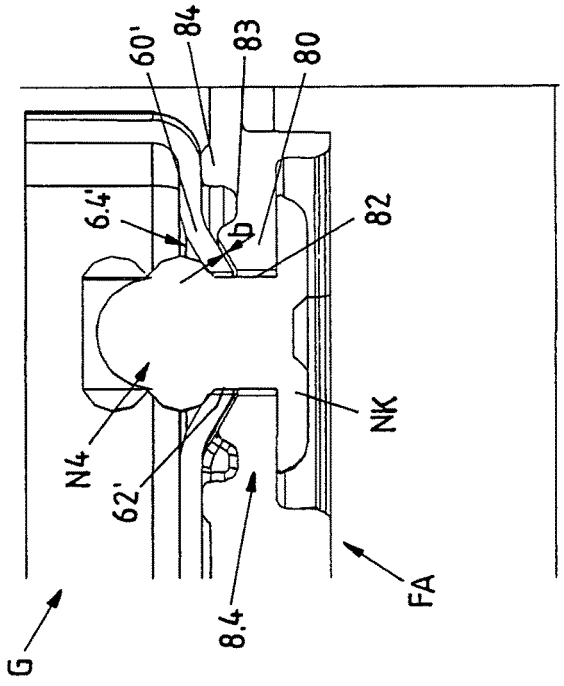
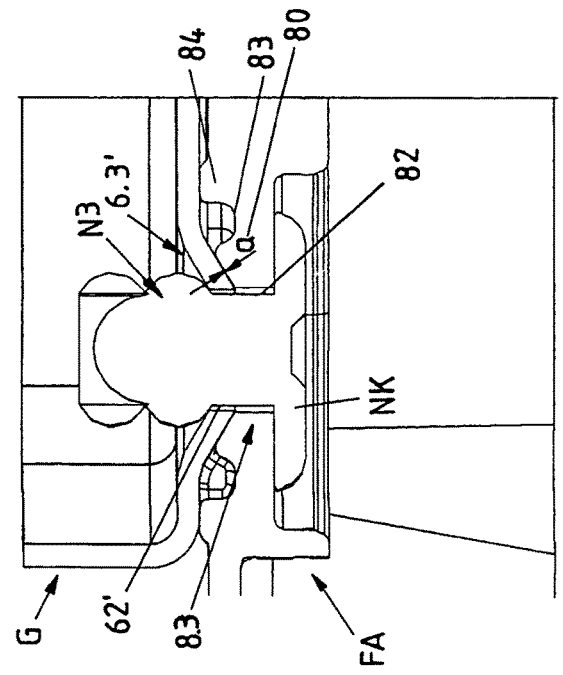

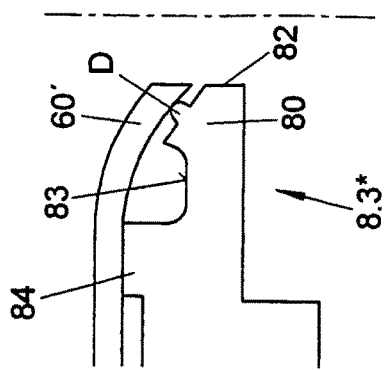
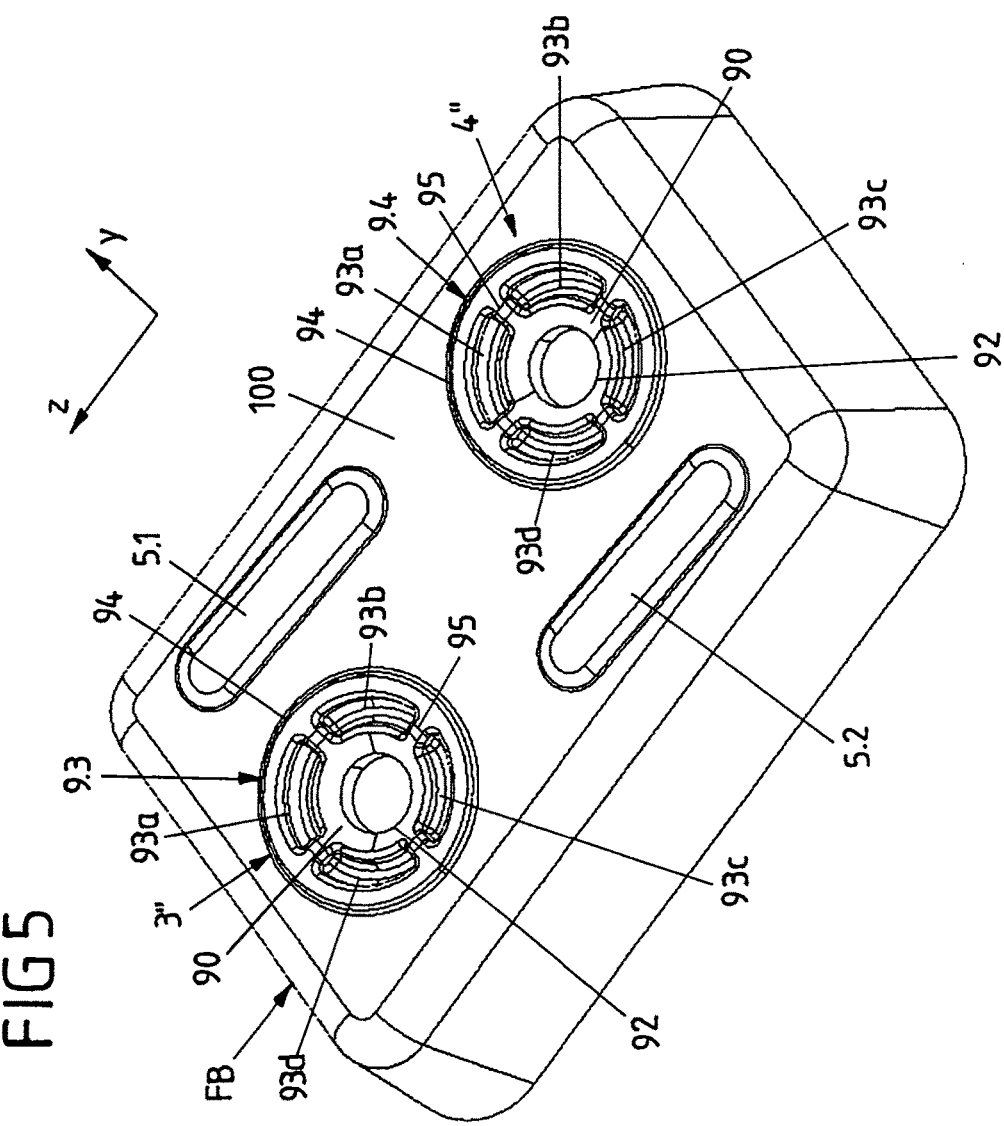

ASSEMBLY WITH AT LEAST TWO COMPONENTS THAT ARE FIXED TOGETHER

CROSS-REFERENCE TO A RELATED APPLICATION

This application is a National Phase Patent Application of International Patent Application Number PCT/EP2012/002871, filed on Jul. 7, 2012, which claims priority of German Utility Model Application Number 20 2011 103 327.2, filed on Jul. 13, 2011.

BACKGROUND

The invention relates to an assembly for a motor vehicle with at least one first and a second component and a method for fixing two components of a motor vehicle assembly together.

Fastening elements (for instance screws or rivets) are usually applied for connecting components of a motor vehicle assembly, which brace the two components against each other and thereby at least one of the two components reaches through a (passage) opening. Such a fastening element reaches therefore into a respective opening at both components in order to fix them in a relative position to each other. For instance, a first opening is formed on a first component as passage opening and a second opening is formed on a second component as passage or pocket hole opening. An opening on a component can result thereby also only by providing the fastening element as this is for instance the case with a self-cutting screw as fastening element.

In case of such a fixing of two components there is in practice regularly the problem that at least locally undesired tensions and deformations are introduced into at least one of the two components via a fastening element. In particular in case of thin-walled components, as provided regularly in the motor vehicle area for saving weight, unfavorable loadings can hereby occur.

DE 198 47 268 A1 suggests for solving this problem for instance that a connecting section with a (passage) opening at one of two components to be connected to each other is set back in respect to the other component and is designed to be deformable. The distance of this connecting section in respect to an unloaded status is reduced by attaching a fastening element. In this manner, a better distribution of the force required for tensioning the two components to each other onto the components is guaranteed with the connecting section having a distance to the other component in the unloaded/non-tensed status. A shift is thus allowed at a section provided therefore in a targeted manner in order to avoid an unbuttoning and/or an arching up of the components to be connected in the area of the opening, into which the fastening element engages. This solution was developed for connecting two metallic components.

The device described in DE 198 47 268 A1 with the set-back connecting section on one of the two components to be connected to each other would thereby also counteract in certain limits the tensions, which result thereby that—due to manufacturing tolerances—the openings on the two components, which have to match each other, do not exactly align to each other, if multiple similar fastening points with two respective openings are provided at the two components.

But DE 198 47 268 A1 leaves it open for instance how the two components will be aligned to each other in a predefined relative position before a fastening element tensions or fixes the two components together.

SUMMARY

Starting therefrom the object of the present invention is accordingly to further improve an assembly for a motor vehicle with at least two components fixed together and furthermore to provide an improved method for fixing such components of a motor vehicle group together. Furthermore, the invention should also provide a secure connection between a metallic and a plastic part without that during a connecting process of the two components damages on the plastic part have to be feared due to tolerance-related position deviations of the components to be connected or due to tolerances of the acting connecting forces.

An assembly for a motor vehicle according to an exemplary embodiment of the invention comprises a first and a second component, which are fixed together via at least one fastening element as for instance a screw or a rivet. Each of the components comprises an opening into which the fastening element engages for fixing the two components. A first opening on the first component is bordered by a flexible shiftable edge section of the first component, which is shifted from the fastening element in respect to an unloaded original status in which the first component is not fixed to the second component. Hereby the first opening with the edge section bordering the same is formed within a receptacle of the first component the receptacle set back in respect to the second component.

According to the invention it is now provided that a section protruding from the second component in direction to the first component extends into the receptacle of the first component, wherein said section borders the second opening of the second component.

Accordingly, the protruding section (protrusion) of the second component projects into the receptacle of the first component such that a part of the second component is received in the receptacle of the first component. The two components (via a form fit) are present subsequently in a relative position to each other about this, wherein depending on the dimensions or the respective shape of the receptacle and the protruding section for instance an adjustability of the one component relative to the other component can still be provided. Thus, the protruding section can be housed within the receptacle such that the one component is (at least slightly) still rotatable or moveable to the other component before the fastening element engages as intended into the opening of the protruding section as well as into the opening of the receptacle.

With the construction of an assembly according to the invention it is thus not only guaranteed that due to the possible shift of the edge section bordering an opening undesired loadings are reduced and manufacturing tolerances can be compensated, but also that with the sections, which comprise the two openings to be connected to each other via a fastening element, a relative position of the two components to each other can also be provided already before attaching or tightening the fastening element.

In a preferred embodiment the edge section of the first component, which borders the first opening, is not only formed flexible (plastically) shiftable, but elastically shiftable. The edge section bordering the first opening and preferably completely surrounding (in a top view of the opening) the first opening can be shifted accordingly starting from an unloaded original status against a restoring force by the assigned fastening element and has the tendency to return into the unloaded original status. By introducing an elasticity in a targeted manner into the receptacle in the area of the first opening, the arrangement of the edge section at the protruding section (projection) inserted into the receptacle is facilitated.

Thus, it can be provided for example that the flexible (elastic) edge section rests, in particular flatly, against the projection of the second component and is pressed against the projection via the fastening element. In this manner, the projection is locked within the receptacle by interaction with the flexible (elastic) shiftable edge section within the receptacle of the first component. The form fit between the two components already provided by the projection protruding into the receptacle is locked thus by attaching (and tightening) the fastening element in such an embodiment by force locking, which results from the pushing or pressing of the shiftable edge section against the projection.

A receptacle on the first component can be formed for instance cone, hollow or bowl shaped, wherein the first opening is provided in the center at the lowest position of said hollow. A projection at the second component can be formed, for instance, with a contour corresponding to the receptacle. The projection can be formed in particular by a cone, hollow or bowl-shaped curve on a wall of the second component.

In an exemplary embodiment, the receptacle comprises a wall which continues at least partially inclined in direction towards the second component. Hereby, insertion of the protruding section or projection of the second component into the receptacle is facilitated.

In a further exemplary embodiment based thereon, the receptacle is formed (truncated) cone shaped, in particular funnel shaped. Hereby, not only the insertion of the projection into the receptacle is facilitated, but—in case of a (truncated) cone shaped design of the projection corresponding thereto—a simple centering of the two openings to each other is achieved simultaneously. Thus, the two cone shapes of the projection on the one hand and the receptacle on the other hand can match each other such that the two cones and thus the center axis of the two openings can be centered to each other by the fastening element engaging in both openings. Furthermore, the flexible (elastic) shiftable edge section of the receptacle can define at least a part of the cone shape such that by attaching (and tightening) the fastening element, the cone shape of the receptacle can be brought into or is brought in (friction) contact with the cone shape of the projection. In this manner an exact fitting of the projection (protruding section) and assigned receptacle is provided also in case of dimensional deviations (being within predetermined tolerances), if the fastening element is attached and tightened as intended.

Alternatively or additionally it can be provided in an embodiment that the second component rests against or is supported by the first component at a supporting area of the first component provided therefore outside of the set-back receptacle. This supporting area can be for instance an edge of the receptacle and/or (flat) areas of the first component elevated projecting in direction towards the second component, wherein the second component rests against or is supported by said first component via the projection or sections distanced thereto at the first component.

In an exemplary embodiment of the assembly according to the invention the edge section of the first component is connected via a weakening area to an edge of the receptacle such that the edge section can be flexible or elastically shifted in respect to the edge of the receptacle. An edge section partially or completely bordering the first opening of the first component is hereby preferably hinged via the weakening area within the receptacle such that it can be flexible or elastically shifted via the fastening element and can be brought to (friction contact) rest against the protruding section already projecting into receptacle. For this reason, the flexible or elastic section can be shiftable for instance in a targeted manner in direction towards the protruding section of the second component such that the edge section rests (flatly) against the protruding section by friction force, if the fastening element engages the same as intended.

The weakening area is realized preferably by a reduction of material in the area within the receptacle bordering the edge section. Hereby, the weakening area comprises accordingly a lower material thickness than the edge section adjacent thereto and the edge of the receptacle adjacent thereto.

In a further exemplary variant the weakening area extends at least partially along a path continuing essentially concentrically to the first opening. An axis defined by the weakening area, about which the edge section can be shifted, continues accordingly (at least sectionally) parallel to an edge of the first opening of the first component. The edge section can be shifted or will be shifted hereby, in particular, with the direction component parallel to a longitudinal extension direction or longitudinal axis of the fastening element engaging into the opening or reaching through said opening.

An opening is preferably formed as a hole with a circular base area such that the weakening area extends along a circular path concentrically to said opening.

In principle multiple weakening areas spatially separated from each other can be provided within a receptacle, which are assigned to a flexible or elastic edge section, or which are assigned to one of multiple flexible or elastic edge sections, respectively.

For example, a singular, continuous flexible or elastic hinged edge section can be provided within the receptacle, which can be shifted flexible or elastically relative to an edge of the receptacle via multiple segment-like weakening areas being separated from each other and arranged about the opening. Alternatively, multiple segments forming an edge of the opening and not being (rigidly) connected to each other can be provided within a receptacle as singular edge sections, which in each case are hinged flexible or elastically at the edge of the receptacle via an appropriate, assigned weakening area. The receptacle can be formed, for instance, (truncated) cone shaped with an essentially circular base area, wherein the opening for the fastening element is provided at the lowest point of the receptacle. The inner wall of this cone shaped receptacle is then formed by singular edge sections separated from each other, which are illustrated in a top view essentially as part of circle sectors or circle sections, and which in each case are connected flexible or elastic shiftable to the edge of the receptacle via an assigned weakening area of multiple weakening areas (or via the common circumferential weakening area).

In an exemplary variant, a continuous weakening area (for one or multiple shiftable edge section) extends annular about the first opening.

In an alternative variant multiple weakening areas are provided in turn, which extend in each case circular segment like about the first opening.

In an exemplary embodiment of an assembly according to the invention one of the two components comprises at least one further receptacle set back in respect to the other component with at least one flexible shiftable edge section, into which a further protruding section of the other component extends. This pair formed by a second receptacle and a second projection does not necessarily have to comprise two openings for a fastening element. Said pair can thus, for instance, be provided only for specifying a relative position of the two components to each other as intended, wherein the flexible/elastic edge section provides for tolerance compensation such that the two components eventually rest against each other also in the area of said (further, second) receptacle.

Alternatively or additionally, a further (functional identical) pair of receptacle and projection can of course also be provided for a (further) fastening element at the two components.

The construction of an assembly according to the invention has been shown to be of an advantage in particular in case of components wherein one is made of a metal and the other is made of a plastic material. It is preferred if hereby the (first) component, which comprises at least a receptacle with a flexible or elastic shiftable edge section, is made of a plastic material.

The two components can be in particular components of a window lifter assembly for a motor vehicle. A first component with one or multiple receptacles can be for instance a functional component of a carrier component (of a plastic material) carrying a motor vehicle window lifter and the other component can be a guide rail (of metal) for specifying an adjustment path for the window pane to be adjusted by the window lifter. The embodiment according to the invention can however also be implemented in other components of a motor vehicle assembly, for instance also in a housing component and a carrier part to which the housing component is to be fixed.

In an exemplary embodiment the fastening element is preferably a rivet via which accordingly a (form and friction locked) rivet connection for fixing the two components to each other is realized. The two openings for the rivet are consequently provided at the two components as passage openings, respectively, the rivet can reach through.

As already at the beginning briefly explained the flexible (or even elastic) shiftable edge section of a receptacle serves preferably for compensating manufacturing tolerances such that the two components can be aligned to each other (at least still slightly) in the area of the flexible edge section, if they are already present in a specified relative position to each other by the engagement of the projection into the corresponding receptacle. The section (projection) protruding into the receptacle is (only) then locked within the receptacle as intended by the shifted edge section pushing against the protruding section. In an embodiment based thereon the shiftable edge section is accordingly formed such that the two components align to each other automatically in the area of the flexible edge section during the fastening process and can form a sustainable connection as intended, wherein the protruding section is locked in the receptacle by the shifted edge section pushed against the protruding section.

According to a further aspect of the present invention an improved method for fixing two components of a motor vehicle assembly together is thus also provided.

In such a method for fixing a first and a second component of a motor vehicle assembly together the two components are fixed together via at least one first and second fastening element in that a fastening element engages in each case in a pair of two openings of which one opening is provided on the first component and one opening is provided at the second component, respectively. Thereby, each one opening of a pair of openings for a fastening element is provided in a receptacle at one of the components which are formed as being set back in respect to the other component. Furthermore, an edge section of the receptacle bordering said opening is formed flexible (or elastic) shiftable such that it can be shifted from a fastening element engaging into the corresponding opening. The respective other opening of a pair of openings for a fastening element is further provided at a section of a component protruding into the direction of the other component. This protruding section (projection) can extend (completely) into an assigned receptacle of the other component.

Within the settings of the method the two components are furthermore arranged in a relative position to each other such that in each case a protruding section extends with one opening into a receptacle comprising the other opening. For fixing the two components together at least one of the protruding sections is locked in an assigned receptacle by resting the flexible (elastic) edge section of this receptacle (flatly) against the protruding section and by pushing the edge section and the protruding section against each other via the corresponding fastening element.

By pushing the shiftable edge section against the section protruding into the receptacle consequently an already existing form lock between the two components is locked subsequently by a friction or force lock. The fastening element, for instance a rivet, acts for this reason directly onto the shiftable edge section or the fastening element exerts a force onto the component with the protruding section (projection) which pushes the projection against the edge section shifting hereby.

Hereby, it is again preferred if the two receptacles are formed essentially (truncated) cone shaped. The respective assigned protruding section is then provided with a corresponding equally essentially cone-like shape such that the two components to be fixed are already present in a specified relative position to each other via two pairs of essentially cone-shaped receptacles and projections before the (final) fixing is obtained via the at least two fastening elements. The cone shape of receptacle and projection allows furthermore a simple centering of the two cone axes and center axes of the two openings when attaching the assigned (first) fastening element. It can thus be guaranteed that the two components are aligned to each other and fixed to each other as intended at least in the area of that receptacle at which at first a fastening element is attached (and tighten up).

It is then further guaranteed at the at least one further receptacle with a flexible (elastic) edge section that no or at least no high undesired tensions are introduced into the two components to be connected to each other in the area of this (second) receptacle via the subsequently attached (second) fastening element.

BRIEF DESCRIPTION OF THE DRAWINGS

Additional features and advantages become clear furthermore in the following description of embodiments by means of the Figures.

FIGS. 1A-1C show different views of an embodiment according to the invention in form of a window lifter assembly with a carrier and a guide rail, which is to be fixed on the carrier.

FIG. 3A shows explosive illustration of an embodiment according to the invention of an assembly for a motor vehicle with a carrier part and a housing part which are to be fixed to each other.

FIG. 3B shows the two components of FIG. 3A in a status fixed to each other.

FIG. 3C shows the carrier part of FIGS. 3A and 3B in an individual view.

FIGS. 4A-4C shows sectional views of the assembly according to the status apparent in FIG. 3B.

FIG. 5 shows an alternatively formed carrier part in perspective view.

FIG. 6 shows an enlarged detail illustration of a carrier part designed alternatively in the area of a receptacle according to FIGS. 3A-3C and 4A-4C.

DETAILED DESCRIPTION

Figure 1C:
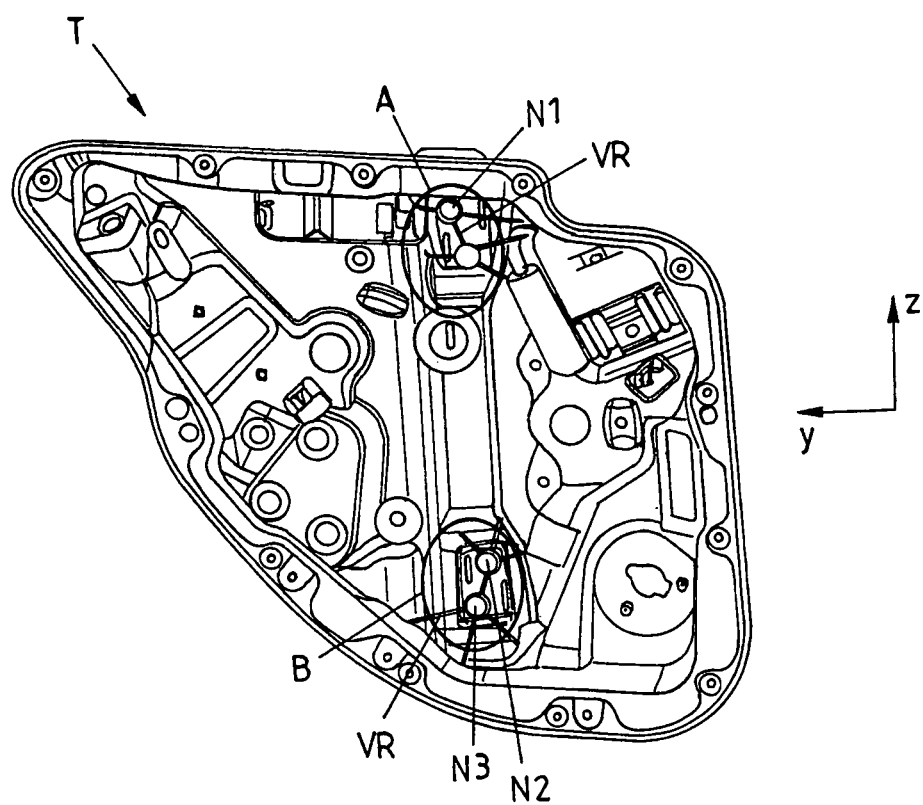

FIGS. 1A-1C and 2A-2B show a first embodiment for an assembly for a motor vehicle according to the invention with a first component in form of a (aggregate) carrier T and a second component in form of a guide rail FS as a component of a not further illustrated motor vehicle window lifter. The guide rail FS is thereby to be fixed in the area of two pairs of fastening points B1, B2 and B3, B4 which are spatially distanced from each other along a longitudinal extension direction of the guide rail FS, and thus at a total of four fastening points on the carrier T. A pair of fastening points B1, B2 is thus accordingly in the area of an (upper) end of the guide rail FS while the other pair of fastening points B3, B4 is arranged in the area of the opposing (lower) end of the guide rail FS.

A protruding section or projection 6.1, 6.2, 6.3 or 6.4 is provided in each case at the fastening points B1 to B4, which in each case protrudes form a (lower) side of the guide rail FS in direction to the carrier T at the guide rail FS. A projection 6.1-6.4 comprises thereby in each case an essentially cone shaped or truncated cone shaped or funnel shaped outer form and is provided centrally with a (second) passage opening 62.

This (second) passage opening 62 of the guide rail FS serves in each case at the fastening points B1, B3 and B4 for the reach through of a fasting element, which is formed here in each case in form of a rivet N1, N2, N3. In contrast, at the fastening point B1 the attachment of a fasting element is not intended.

Fastening points 1 to 4 corresponding in each case to the fastening points B1 to B4 of the guide rail FS are provided on the carrier T in two fastening sections TA and TB distanced to each other with essentially rectangular base area. (First) passage openings are formed equally on three out of the four fastening points 1 to 4 as fastening openings 72. Accordingly it is provided at these fastening points 1, 2 and 4 that an assigned rivet N1, N2 or N3 reaches through the (first) fastening opening 72 of the carrier T as well as the therewith corresponding (second) opening 62 of the guide rail FS and tenses the two components T and FS here with each other in order to fix them together.

A pair of fastening points 1, 2 and 3, 4 in a fastening section TA or TB is thereby formed in each case by an essentially also cone shaped or truncated cone shaped receptacle 7.1-7.4, which is formed set back in respect to a flat (upper) side 100 of the respective fastening section TA or TB, against which the guide rail FS rests with its lower side 200. The inclined inner walls of a receptacle 7.1-7.4 continue thus—if looked at from a center point of the receptacle 7.1-7.4—inclined in direction to the guide rail FS, if said guide rail is fixed to the carrier T. A receptacle 7.1-7.4 is accordingly formed set-back also in contrast to the guide rail FS to be fixed on the carrier T.

The singular rivets N1, N2 and N3 are guided from a back side of the flat carrier T facing away from the guide rail FS through a pair of premade (passage) openings 62, 72 brought into alignment to each other in the area of the fastening points 1, B1; 3, B3 and 4, B4 such that a rivet N1, N2, N3 reaches in each case through both openings 62, 72. A rivet head NK of a rivet N1, N2 or N3 rests hereby on the backside of the carrier T in a recess H1, H3, H4 provided therefor against the carrier T and pushes in the tightened status the guide rail FS in the area of the assigned fasting point B1, B3 or B4 against the carrier T such that the guide rail FS is fixed on the carrier part T via the three rivets N1 to N3 immobile on the carrier T.

Reinforcing ribs are provided on the back side of the carrier T for reinforcing the fastening point 1, 2, 3 and 4 on the carrier T. Said reinforcing ribs continue in each case from a center point of a receptacle 7.1-7.4 radially outwards and serve thereby for a better force transmission of the forces acting from the guide rail FS in the area of the fastening points 1-4 onto the carrier T. A majority of reinforcing ribs VR continues thereby in each case star shaped from a center point of a receptacle 7.1-7.4 radially outwards as apparent in the areas of FIG. 1C emphasized with "A" and "B".

In the area of a fastening point 2 with a receptacle 7.2 no passage opening to the back side of the carrier T is provided on the base of the receptacle 7.2 that means on the lowest point of the receptacle 7.2. Rather the base or bottom of the receptacle 7.2 is formed by a closed basis 71* which is opposed in a slight distance to the projection 6.2 of the guide rail FS resting in the receptacle 7.2.

No engagement of a fastening element is intended at this receptacle 7.2 in order to lock the projection 6.2 within the receptacle 7.2 (friction forced). Thus the projection 6.2 defining an insertion area 62 engages solely form locked into the receptacle 7.2.

The inclined continuing walls of the projection 6.2 being adjacent to the projection 6.2 with the insertion area 61, wherein said walls define the cone shape or truncated cone shape, comprise further a flat resting area 60. This resting area 60 faces an inner wall of the receptacle 7.2, however does (here) not rest flatly against said inner wall. The projection 6.2 can be supported here by the inner wall of the receptacle 7.2, in particular if the guide rail FS is pushed in the area of the receptacle 7.2 in direction to the carrier T.

Those receptacles 7.2, 7.3 and 7.4 at the fastening points 1, 3 and 4 of the carrier T at which a continuous fastening opening 72 (connecting the both sides of the carrier T with each other) is provided, are formed as far as possible identical to the one receptacle 7.2 at the base 71* thereof not such continuous fastening opening 72 is provided. In contrast to the previously described receptacle 7.2 these receptacles 7.1, 7.3 and 7.4 comprise however in each case a fastening opening 72 for a fastening element N1, N2 or N3 as well as an elastic edge section 70, which can be shifted elastically in direction to the respective projection 6.1, 6.3 or 6.4 of guide rail FS and relative to a base 71 of the carrier T facing the guide rail FS, if the carrier T or the respective receptacle 7.1, 7.3 or 7.4 is pushed (stronger) against the carrier T for instance during the fixation by a fastening element N1, N2 or N3. The basis 71 is hereby formed by a section of the carrier T surrounding a receptacle 7.1, 7.3 and/or 7.4.

The elastic or elastic shiftable section 70 is formed comparatively thin walled and extends from an edge of the respective receptacles 7.1, 7.3 and 7.4 inclined in direction to the fastening opening 72. Since the edge section 70 comprises a free end due to the respective fastening opening 72 and is made comparatively thin walled (preferably made of plastic material in an injecting molding procedure) it is inherent elastically such that it is elastic shiftable relative to the base 70 by the distance and thus relative to the edge of the respective receptacle 7.1, 7.3 and 7.4. The elastic edge section 70 can thus be shifted in particular in direction to the respective projection to 6.1, 6.3 or 6.4 and relative to the base 70, if a projection 6.1, 6.3 or 6.4 is pushed by a force impact stronger into the assigned receptacle 7.1, 7.3 or 7.4 or the carrier T is pushed in the area of the projection 6.1, 6.3, 6.4 stronger in direction of the guide rail FS.

This is in particular of an advantage in order to compensate eventual manufacturing tolerances when fixing the guide rail FS to the carrier T and to be able to align the two components FS and T still at least slightly to each other, if the singular projections 6.1-6.4 have already been inserted into the respective assigned receptacle 7.1-7.4 and thus the carrier T and the guide rail FS have already been arranged in a specified relative position to each other before their fixation via the rivets N1 to N3.

Since the singular projection 6.1 to 6.4 and the singular receptacles 7.1-7.4 are formed in each case such that a projection 6.1-6.4 is received form locked in the assigned receptacle 7.1-7.4 before a fastening element in form of a rivet N1, N2, N3 is propelled through the three available pairs of openings 62, 72 or finally tightened up, the assembly of such a window lifter assembly is facilitated considerably. Furthermore, due to the cone-like shape of the receptacle 7.1-7.4 and the corresponding cone-like shape of the projections 6.1 to 6.4 an easier centering of this section to each other is possible.

The singular elastic edge sections 70 allow thus the compensation of manufacturing tolerances such that the (metallic) guide rail FS can be fixed to the (plastic) carrier T by avoiding tensions as much as possible. The singular fastening elements N1, N2, N3 are attached preferably one after the other or all have already been attached such that they engage (or reach through here) into the respective assigned openings 62, 72, but are only tightened or fixed one after the other. Apart from that, when tightening a rivet N1, N2, N3 a pin like rivet section which is guided through both components T, FS and which protrudes from the rivet head NK, is deformed such that the two components T, FS are surrounded form locked between the deformed rivet section and the rivet head.

At present the (first) rivet N1 of the receptacle 7.1 is tightened at first, which is adjacent to the (second) receptacle 7.2, for which no fasting element is provided. Subsequently it is started with the said first receptacle 7.1 which has the smallest distance to the said second receptacle 7.2, at which no fasting possibilities for a fastening element are provided.

By tightening or fasting the rivet N1 the projection 6.1 approaches (further) the assigned receptacle 7.1 against the restoring force inherent to the elastic shiftable edge section 70. Hereby the outside surface of the projection 6.1 defining also the cone-shape of the projection 6.1 rests flatly against the elastic edge section 70 via the resting area 60. Due to the elastic shiftability of the edge section 70 said edge section allows for an exact centering of the two openings 62, 72 brought to cover each other as well as the two cones or truncated cones defined by the receptacle 71 on the one hand and the projection 6.1 on the other hand.

The edge section 70 is thereby shifted so far that it rests (flatly) against the assigned projection 6.1 or comprises at least a minimal distance a from said projection. In the area of the first receptacle 7.1, at which a rivet N1 is at first tightened when fixing the guide rail FS to the carrier T, is thus guaranteed that the guide rail FS is aligned exactly relative to the carrier T and the projection 6.1 rests against the elastic section 70 friction locked and rests as well form locked in the receptacle 7.1 and in the fastening opening 72 via the extension.

In the receptacle 7.2 being adjacent to the first receptacle 7.1 (at the same fastening section TA) at which no fastening element is provided, the projection 6.2 is however in any case received form locked within the assigned receptacle 7.2, wherein here it is also at least guaranteed by the elastic section 70 that the projection rests (flatly) against the elastic edge section 70 via its resting section 60.

In case of the two further receptacles 7.3 and 7.4, at which the (second and third) rivet N2 and N3 are tightened one after each other, eventually no exact centering of the two cones of the respective projection 6.3. or 6.4 to the assigned third or fourth receptacle 7.3 or 7.4 is possible due to the manufacturing tolerances. An exact fit is however at least possible at the first receptacle 7.1 via the elastic edge section 70 and at the two remaining receptacles 7.2 and 7.4 the respective elastic edge section 70 also here provided in each case can provide for a further tolerance compensation such that the rivet N2 and N3 cause only tensions to a small extent.

Figures 2A, 2B:
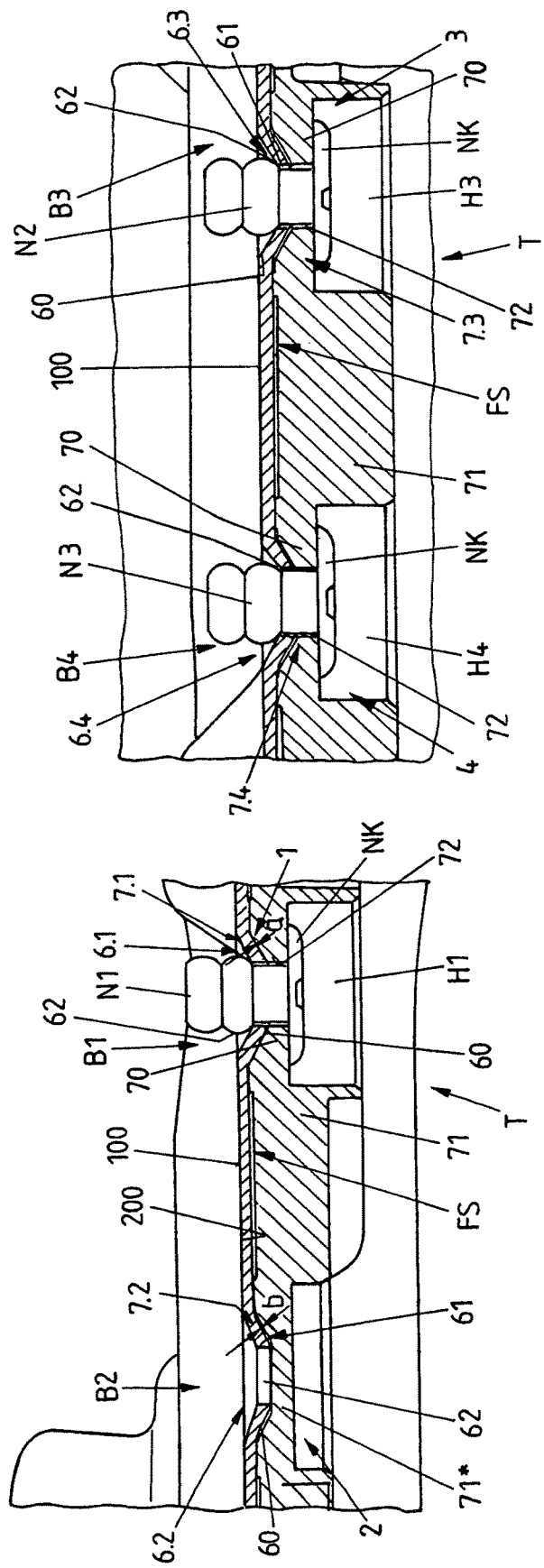
FIGS. 2A-2B show two sectional views of two fastening sections distanced from each other along the longitudinal extension direction of the guide rail of the FIGS. 1A-1C, wherein the guide rail is fixed on the carrier within said fastening sections.

As deducible from the enlarged detail illustrations of the FIGS. 2A and 2B an edge section 70 is approached here also stronger to the respective resting area 60 by a rivet N2, N3 such that a distance from the respective projections 6.3, 6.4 is in each case at least somewhat smaller than a distance b of the elastic edge section 70 from the resting area 60 of said second receptacle 7.2 through which no fastening element is guided.

Apart from that the singular fastening elements N1, N2 and N3 formed as rivets rest against the carrier T in a space saving manner with their respective rivet head NK in the bowl shaped recess H1, H2 or H3 each provided at the back side of the carrier T therefore.

It is furthermore pointed out that due to the cone like resting area in the resting area 60 of a projection 6.1 to 6.4 and at the assigned elastic edge section 70 a bearing stress of a rivet N1, N2, N3 is drastically reduced.

Support areas 5 protruding elevated in each case in direction to the guide rail FS are further provided on the plane, flat upper side 100 of a fastening section TA, TB for the defined support of the guide rail FS at the fastening sections TA and TB of the carrier T. The guide rail FS rests thus here in a defined manner on the edges of the receptacle 7.1 to 7.4 and on the other hand on support areas 5 of the carrier T provided outside of the receptacle 7.1 to 7.4. Thereby the (additional) support areas 5 (or the support areas 5.1 and 5.2 in the subsequently described variants) distanced spatially to the singular receptacle 7.1 to 7.4 avoid thereby a rotation or torsion of the longitudinally extending guide rail FS during its fixation on the carrier T and thus the transfer of undesired share forces into the receptacles 7.1 to 7.4.

Such support areas, here also in form of longitudinal extending elevated areas on an upper side 100, comprise also a carrier part FA of the embodiment of FIGS. 3A-3C and 4A-4C. A further (second) component, here in form of a shell-like housing part G, is fixed via two fastening elements in form of rivet N3 and N4 on said carrier part FA. The carrier part FA (or the section of said carrier part FA visible here in the figures) is also formed shell-like, wherein the carrier part FA and the housing part G are fixed together with sides being essentially parallel to each other such that a circumferential wall defining in each case the shell form extends essentially vertical away from the side connected to the other component. A flat lower side 200 of the housing part G faces thus a flat upper side 100 of the carrier part FA.

Projections 6.3' and 6.4' are also here provided at fastening points B3', B4' at the one component, the housing part G, for fixing the two components FA, G together. Said projections 6.3', 6.4' protrude on the lower side 200 of the housing part G in direction towards the carrier part FA and project in each case when arranging the two components FA, G to each other as intended into a receptacle 8.3 or 8.4 at fastening point 3', 4' of the carrier part FA provided therefore.

The receptacles 8.3 and 8.4 are identical to each other and are formed set back in respect to the housing part G. The receptacles 8.3 and 8.4 are thereby (like a pair of receptacles 7.1, 7.2 and 7.3, 7.4) spatially offset to each other. Furthermore, the receptacle 8.3 and 8.4 are formed also here cone shaped, wherein in the area of an imaginary cone tip a (first) fastening opening (through hole 82) connecting two opposing sides of the carrier part FA to each other is provided in the center.

The respective assigned projection 6.3', 6.4' of the housing part G forms a conical counter form corresponding thereto, wherein here likewise in the area of an imaginary cone tip a continuous (second) opening (through hole 62') connecting two sides of the housing part G to each other is provided in the center. When arranging the two components together as intended, the two openings 62', 82 are subsequently brought to cover each other such that a rivet N3 or N4 can be guided through said openings and can be tightened up, in order to fix the two components FA, G together.

Each of the projections 6.3' and 6.4' comprises a resting area 60' formed by an inclined continuing outer coat area defining the cone shape. Said resting area 60' can be brought at present to rest against an elastic edge section of the assigned receptacle 8.3, 8.4. Thereby a projection 6.3', 6.4' and a receptacle 8.3, 8.4 are in each case synchronized to each other such that the projection 6.3', 6.4' does not rest within the receptacle 8.3, 8.4 until a rivet N3, N4 is attached there and tightened up.

Although a projection 6.3', 6.4 extends into the assigned receptacle 8.3 or 8.4 when arranging the housing part G at the carrier part FA. However, the housing part G rests (at first) exclusively with its lower side 200 against elevated support areas 5.1 and 5.2 provided therefore at the upper side 100 of the carrier part FA as well as against two narrow banded support sections 84, which in each case circulate the edge of a receptacle 8.3 or 8.4. A support section 84 protrudes thereby in the same manner from the upper side 100 of the carrier part FA in direction of the housing part G like a support area 5.1, 5.2.

The fastening opening 82 of a receptacle 8.3, 8.4 is also here bordered completely circumferentially by an elastic shiftable edge section 80. The elasticity is hereby provided via a weakening area 83 continuing annular about the opening 82. In this weakening area 83, the material thickness of the receptacle 8.3, 8.4 is reduced in respect to an edge of the receptacle 8.3, 8.4 radially adjacent to a side of the weakening area 83 (as well as in contrast to the edge section 80 radially adjacent to the other side of the weakening area 83) such that the edge section 80 is hinged elastically via the weakening area 83 to the edge of the receptacle 8.3, 8.4. The material strength of the edge section 80 is thereby furthermore chosen such that the rivet N3, N4 guided through the opening 82 cannot be supported readily in axis direction of the rivet pin and thus does not fail due to the forces appearing during a deformation of the rivet for fixing the two components together.

The weakening area 83 appearing in the sectional views of FIGS. 4B and 4C as a notch provides at present in particular a shiftability of the respective edge section 80 (in axis direction of a rivet pin) towards the projection 8.3' or 8.4' inserted into the receptacle 8.3, 8.4, respectively. Such an elastic edge section 80 can be pushed (flatly) against the resting area 60' of the projection 6.3' or 6.4' by means of a fastening element in form of a rivet N3, N4. Hereby, a locking of the projection 6.3' already engaging form locked into the (first) receptacle 8.3 can be achieved by traction in particular in case of a (first) fastening element or rivet N3, if the housing part G and the carrier part FA are fixed together. The elastic edge section 80 can provide thus for a compensation of existing manufacturing tolerances when tightening up the rivet N3.

When successively attaching the two fastening elements or rivet N3, N4 or at least a successive tightening thereof, a centering of the center or bore axis of the two openings 62', 82' and a full-flatly friction contact resting of the elastic edge 80 against the projection 6.2' inserted into the receptacle 8.3 can be obtained via the at first attached or tightened up rivet N3 (compare FIG. 4B). Accordingly, an exact fit of the projection 6.3' in the receptacle 8.3 for fixing the housing part G at the carrier part FA is achieved in which the elastic edge section 80 rests directly against the projection 6.3' or comprises at least a minimal distance a thereto. At the remaining second fastening point B4' of the housing part G and the fastening point 4' of the carrier part FA the elastic edge section 80 of the receptacle 8.4 approaches also the inserted projection 6.4' up to a small distance b (ideally in the range of 0.2 to 0.4 mm) via the subsequently tightened of rivet N4. The desired fixation of the two components in a specific alignment to each other is thus guaranteed also in case of possible tolerance related deviations in the dimensions of the receptacles 8.3, 8.4 and the projections 6.3' and 6.4' by introducing only small tensions in the two components FA, G in the area of the fastening points 3', B3' and 4', B4'.

The rivet heads NK of the rivets N3, N4 are received also in case of the carrier part FA in each case in a recess H3, H4 on the backside of the carrier part FA opposing the housing part G and the upper side 100. The recesses H3 and H4 are here present at a lower flat area, which is bordered by the side walls of the carrier part FA.

It is still pointed out that an edge section 80 can be formed also of course divided in multiple singular segments. The edge section segments have then thereby subsequently a shape similar to a circle segment and can be shifted flange like in direction to the respective projection 6.3, 6.3', and 6.4' via tightened rivet N3, N4.

An alternative designed carrier part FB is evident in the perspective view of FIG. 5, which comprises two modified receptacles 9.3 and 9.5 in contrast to the embodiment of the FIGS. 3A to 3C and 4A to 4C, but is otherwise provided identical.

The receptacles 9.3. and 9.4, which are also here cone-shaped, serve equally the reception of projections 6.3' and 6.4' of a housing part G (not shown in FIG. 5). The fastening points 3" and 4" at the carrier part FB defined in each case via the receptacles 9.3 and 9.4 comprise in accordance to the preceding embodiment a support area 94 annular circumferential surrounding the respective receptacle 9.3, 9.4. In each of the cone-shaped receptacles 9.3 and 9.4 a (first) continuous fastening opening 92 is also provided, which is bordered by an elastic shiftable (and optionally separated in singular sequence) edge section 90.

The shiftability of the edge section 90 in respect to an edge of the respective receptacle 9.3 or 9.4 is not formed hereby by a weakening area, which annular circumference the fastening opening 92, in contrast to the embodiment of the FIGS. 3A to 3C and 4A to 4C, but is provided by multiple (here four) weakening areas 93a, 93b, 93c and 93d, which in each case circumference circularly segment-like the fastening opening 92 and which are spatially separated from each other.

The singular weakening areas 93a-93d extend thus also along a circular path about the fastening opening 92. They are, however, formed as singular segments distanced to each other, which comprise a reduced wall strength or material thickness in respect to the edge of the receptacle 9.3, 9.4 and in respect to the adjacent edge section 90. A connecting bar 95 proceeds thus in each case between two weakening areas 93a, 93b; 93g, 93c; 93c, 93d or 93d, 93a. The weakening areas 93a to 93d are thus at present connected to each other pairwise via a total of connecting bars 95.

These connecting bars 95 proceed at present along the main loading directions (extending vertically to each other and radially outwards from the opening 92). They serve thereby as enforcement for force transmission. The connecting bars 95 would proceed in an arrangement of the receptacles 9.4 and 9.5 at a carrier T of the FIGS. 1A to 1C essentially along the longitudinal extension direction (in Z- and −Z-direction) of the guide rail FS and across thereto (in Y- and −Y-direction). The largest forces occur along the two main loading axes defined thereby when assembling the carrier T and the guide rail FS in a motor vehicle structure as intended and when using the corresponding window lifter as intended, wherein said forces shall be securely introduced into the carrier T.

Such connecting bars 95, as local material enforcement, can, of course, be provided within an alternative designed receptacle, which does not comprise four circular segment-like weakening areas 93a to 93d.

The functionality of the shiftable edge section 90 explained in context to the previous embodiment is remained hereby. Only a larger stability of the fastening of the edge section 90 to the edge of a receptacle 9.3, 9.4 is achieved. Thus, also in this embodiment it is achieved that the two components FB and G (as also in the previous embodiments the two components T and FS or FA and G) align to each other automatically in the area of the flexible edge section 90 (70 or 80) during the fastening process and can form a sustainable connection as intended, wherein at least one protruding section 6.3' (6.1) is locked in the receptacle 9.3 (8.3 or 7.1) by the shiftable edge section 90 (70 or 80) pushed against said protruding section 6.3' (6.1).

In FIG. 6 a detailed view of a possible variant for receptacle 8.3* is illustrated, which corresponds essentially to a receptacle 8.3, 8.4 or 9.3, 9.4 of the previous embodiment. Identical reference signs are used accordingly for corresponding elements.

The deformation rib D (optionally annular circumferential about the fastening opening 82) is provided in the receptacle 8.3* at an elastic edge section 80.

Said deformation rib D comprises a material strength which is by many times smaller in contrast to the material thickness of the edge section 80, and protrudes elevated in direction to the projection to be inserted (also in joining or connecting direction) with its resting area 60' at the elastic edge section 80.

The deformation rib D is shaped at the edge section 80 and reduces locally the distance to be (first) adjusted between the projection and the edge section 80 in case of the projection inserted into the receptacle 8.3*. Said rib serves thus for bridging optionally present tolerances being too large such that the projection inserted into the receptacle 8.3* rests (always) at least locally against the deformation rib D. Excessive fastening forces can be reduced in a targeted manner by the deformation of the deformation rib D such that undesired large deformations or damages of the supporting areas of the plastic connecting area of the first component (thus the carrier T or the carrier part FA or FB) can be avoided safely.

An insulation between the two components to be fixed together can also be provided via the deformation rib D. The deformation rib D can be formed such that it fails in a targeted manner if the elastic edge section 80 is pushed by the tightened fastening element, for instance a rivet, with sufficient force against the resting area 60' of the projection inserted into the receptacle 8.3*. The squeezed insulation rib D can form accordingly a barrier for humidity, which prevents that for instance humidity reaches from one side of the carrier part FA via the fastening opening 82 between the two components FA, G or vice versa.

The deformation rib D can be molded in particular to the elastic edge section 80.

Alternatively, a compressible insulating element, for instance made of rubber, can be provided of course also instead of a failing deformation rib D at the edge section 80.

The pairs of receptacles and projections visible in the reflected Figures can be combined with each other of course as desired. At the same time, it is not required that multiple receptacles are provided always only at one component and the corresponding projections are provided at the other component. Thus, it can in particular provided that a (first or second) component comprises a projection and a receptacle, respectively.

The combinations of receptacles 8.3, 8.3*, 8.4, 9.3 and 9.4 and projections 6.3', 6.4' deducible in the FIGS. 3A to 3C and 4A to 4C as well as in the FIGS. 5 and 6 can be used of course also in context with components of a window lifter assembly according to the FIGS. 1A-1C and 2A-2B.

The invention claimed is:

1. A window lifter assembly for a motor vehicle, the assembly comprising at least a first component of a carrier element for carrying a motor vehicle window lifter and a second component of a guide rail which the first and the second components are fixed together by at least one fastening element, wherein the first component comprises a first opening and the second component comprises a second opening into which the fastening element engages for fixating the two components together, and the first opening is bordered by a shiftable edge section of the first component, which is shiftable by the fastening element with respect to an unloaded original status in which the first component is not fixed to the second component, wherein the first opening with the edge section is formed within a receptacle of the first component, the receptacle being set back with respect to the second component, wherein a section of the second component protruding from the second component towards the first component extends into the receptacle, wherein said section borders the second opening of the second component, and wherein the edge section of the first component is elastically shiftable and wherein the protruding section of the second component rests against the edge section of the first component.

2. The window lifter assembly according to claim 1, wherein the second component rests outside of the set-back receptacle of the first component on support areas provided therefore on the first component.

3. The window lifter assembly according to claim 1, wherein the receptacle comprises a wall which extends at least partially inclined in a direction towards the second component.

4. The window lifter assembly according to claim 3, wherein the receptacle is cone-shaped.

5. The window lifter assembly according to claim 4, wherein the receptacle is funnel-shaped.

6. The window lifter assembly according to claim 1, wherein the receptacle has weakening areas connected together by connecting bars formed within the receptacle, wherein the connecting bars are provided as reinforcements for transfer of forces from one of the first and second components into the other of the first and second components and which extend essentially along at least one main loading direction.

7. The window lifter assembly according to claim 1, wherein the edge section of the first component is connected via a weakening area to an edge of the receptacle such that the edge section is flexible or elastically shiftable with respect to the edge of the receptacle.

8. The window lifter assembly according to claim 7, wherein the weakening area has a smaller material thickness than an adjacent edge section and the edge of the receptacle adjacent thereto.

9. The window lifter assembly according to claim 7, wherein the weakening area extends at least partially along a path which continues essentially concentrically to the first opening.

10. The window lifter assembly according to claim 9, wherein the weakening area extends annular around the first opening or the weakening area extends circular segment-like around the first opening.

11. The window lifter assembly according to claim 9, wherein the weakening area extends at least partially along a circular path.

12. The window lifter assembly according to claim 1, wherein at least one further receptacle is provided with at least one flexibly shiftable edge section at one of the two first and second components, the at least one further receptacle being set back with respect to the other one of the first and second components and into which a further protruding section of the other one of the first and second components extends.

13. The window lifter assembly according to claim 1, wherein at least one deformation rib is provided at the at least one flexible edge section and which projects in a direction towards the protruding section, the at least one deformation rib being formed such that it deforms if the shiftable edge section and the protruding section are pressed against each other by a force exceeding a threshold value.

14. The window lifter assembly according to claim 1, wherein one of the first and second components is made of metal and the other of the first and second components is made of a plastic material.

15. The window lifter assembly according to claim 1, wherein the fastening element is a rivet.

16. The window lifter assembly according to claim 1, wherein the at least one shiftable edge section is formed and provided for compensation of manufacturing tolerances and to allow the first and second components to automatically align to one another in the area of the flexible edge section during the fastening process in order to form a solid connection, wherein the protruding section is configured to be locked in the receptacle by the edge section when it is shifted and pushed against the protruding section.

* * * * *